United States Patent [19]
McLellan

[11] Patent Number: 5,394,428
[45] Date of Patent: Feb. 28, 1995

[54] CONTROLLED, HIGH-POWER LASER OSCILLATOR

[76] Inventor: Edward J. McLellan, 422 Connie Ave., Los Alamos, N. Mex. 87544

[21] Appl. No.: 27,417

[22] Filed: Mar. 8, 1993

[51] Int. Cl.$^6$ .............................................. H01S 3/08
[52] U.S. Cl. ...................................... 372/95; 372/19; 372/97; 372/98; 372/99; 372/92
[58] Field of Search ................... 372/92, 95, 97, 19, 372/98, 99

[56] References Cited

U.S. PATENT DOCUMENTS 5,185,753  2/1993  Benda et al. ............................ 372/95

Primary Examiner—Léon Scott, Jr.
Attorney, Agent, or Firm—Samuel M. Freund

[57] ABSTRACT

Controlled, high-power laser oscillator. A single laser gain medium is used to efficiently generate high-power, controlled laser light without exposing the control elements to high-power radiation. The control element or elements are separated from the oscillator gain volume by a separator optic which permits only a portion of the energy from the gain volume to enter the region of the control elements, laser light having the desired characteristics being returned to the gain volume through the separator optic. Energy not entering the control region exits the laser as oscillator output energy in order to obtain high efficiency.

7 Claims, 3 Drawing Sheets

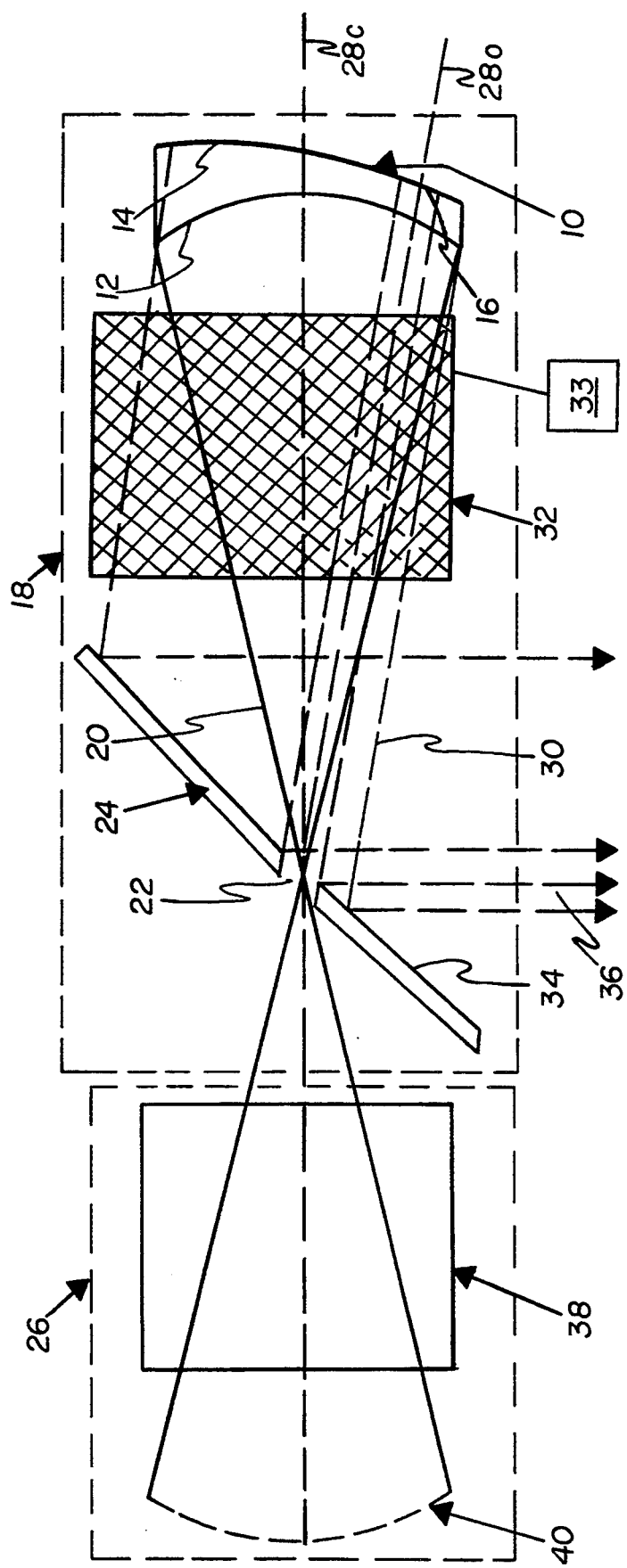

CONTROLLED, HIGH-POWER LASER OSCILLATOR

BACKGROUND OF THE INVENTION

The present invention relates generally to controlled laser oscillators and, more particularly, to an apparatus for controlling high-power laser oscillators while exposing the control elements only to low-power.

Oscillator/amplifier combinations are often used to obtain high-power pulses from a laser where control of the mode structure, frequency, polarization, and pulse shape, or a combination of these features is desired. The control elements are located in the oscillator portion of this combination, since low-power, controlled oscillator output pulses can then be amplified by a laser amplifier in what is commonly termed a master oscillator/power amplifier design or MOPA. See, e.g., U.S. Pat. No. 4,596,017 for "Electron Beam Method And Apparatus For Obtaining Uniform Discharges In Electrically Pumped Gas Lasers," which issued to Charles A. Fenstermacher and Keith Boyer on Jun. 17, 1986, FIG. 5 and the description in Column 4, lines 12-24, wherein a gallium arsenide crystal is used for mode-locking and pulse switching a laser oscillator from which a single pulse is selected to drive a series of laser amplifiers which provide the final output. An alternative to this design is the injection-locked oscillator configuration, where the low-power laser pulses are injected into a high-power gain medium. See, e.g. "Stabilization Of The Frequency Of A Pulse-Periodic TEA $CO_2$ Laser By Injection Of A Signal From A Low-Pressure cw Laser," by V. Yu. Baranov et al., Sov. J. Quantum Electron., 9, 1456 (1979) and "Mode Selection And Frequency Tuning By InJection In Pulsed TEA-$CO_2$ Lasers," by Pierre H. Flamant and Robert T. Menzies, IEEE J. Quantum Electron., QE-19, 821 (1983).

The MOPA design does not saturate the amplifier section completely, since if the amplifier were to be driven such that saturation were approached, the original characteristics of the driving oscillator pulse would be distorted, thereby degrading the control of the output laser pulse. Therefore, the extraction efficiency of laser energy is poor when laser amplifiers are compared with uncontrolled oscillators having the same gain volume. For long pulses or in the situation where very high gain is desired for efficient energy extraction, pulses from injection-locked oscillators will degrade into pulses characteristic or inherent for that oscillator design. Thus, both designs are limited in their ability to control laser pulses while maintaining high extraction efficiencies. Moreover, both designs utilize two gain media.

Accordingly, an object of the present invention is to provide a high-power, controlled laser oscillator having a single gain volume.

Another object of the invention is to provide a high-power, controlled laser oscillator having a single gain volume where the control elements are only exposed to low-power laser radiation, Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the controlled, high-power laser oscillator of the present invention includes a laser gain medium for amplifying laser oscillations, a reflecting optical element located at one end thereof for returning laser oscillations to the gain medium, a separator element located at the other end of the gain medium from the reflecting optical element for dividing the energy generated in the gain medium into a laser output portion and a control portion, and a control element or elements for receiving the control portion of the laser energy directed thereon by the separator element, for introducing the chosen characteristics into the control portion directed thereonto, and for returning a portion of the laser energy onto which the chosen characteristics are introduced to the gain medium.

Preferably, the separator element is a partial reflector disposed at a chosen angle with respect to the optical axis of the gain medium, the reflected energy becoming the output of the laser, while the transmitted portion is directed onto the control element.

It is preferred for high power applications, that the separator element is a totally reflecting element disposed at a chosen angle with respect to the optical axis of the gain medium and having a hole therein through which oscillator energy may pass and impinge onto the control element and return therethrough to the gain medium, after having been imparted with the desired characteristics.

It is also preferred that the reflecting optical element have two reflecting surfaces, one behind the other, and having two radii of curvature, such that a portion of the oscillator energy is focused through the hole in the separator element, and the remainder thereof is collimated such that the portion of the oscillator energy which is reflected by the separator element after passing through the gain medium is collimated, the optical element further having an on-axis or central portion thereof having low reflectivity in order to prevent axial mode laser oscillations which would permit oscillator energy from both surfaces thereof to impinge upon the control element or elements.

Benefits and advantages of the present invention include high extraction efficiency for controlled oscillator energy from a single gain volume, while maintaining low laser power on the control elements.

BRIEF DESCRIPTION OF THE DRAWING

The accompanying drawings, which are incorporated in and form a part of the specification, illustrate general embodiments of the present invention and, together with the description, serve to explain the principles of the invention.

FIG. 3 is a schematic representation of the subject controlled, high-power laser oscillator showing the situation where the laser oscillator output and control optical axes are not colinear.

DETAILED DESCRIPTION OF THE PREFERRED EMBODIMENTS, OF THE INVENTION

Briefly, the present invention in its broadest form permits the use of a single laser gain medium to efficiently extract high-power, controlled laser light without exposing the control elements to high-power radiation.

To achieve this objective, the control elements must be separated from the gain volume by a separator element which permits only a portion of the energy from the gain volume to enter the control region. Energy not entering the control region must exit the laser as output energy in order to obtain high efficiency. A general embodiment of the invention could include a partially transmitting optical element disposed at a chosen angle with respect to the optical axis of the oscillator for separating the control region from the gain region. The portion of the laser energy which exits the gain region and is reflected from the partial transmitter becomes the output beam, while the transmitted portion passes into the control region, is returned to the gain region after passing again through the partial transmitting element, and makes additional passes through the gain medium. For high power systems, it is desirable to permit only a few percent of the energy to enter the control region. Since the oscillator portion of the laser beam which exits the control region must pass through the separator element a second time, the losses in the oscillator are significant, resulting in a loss of overall laser efficiency. A more efficient design would be to use a high reflectivity mirror through which the oscillator energy would pass without losses. The optical element at the other end of the oscillator would then be designed so that a portion of the oscillator energy would be reflected into the hole in the separator mirror, and into the control region where it is acted upon by the control elements and then returned to the gain region through the hole. A portion of the oscillator energy would be collimated by the optical element at the end of the gain region which energy, after passing through the gain medium, would be reflected from reflector oriented at a chosen angle with respect to the optical axis of the oscillator as the laser output. To prevent axial mode characteristics which would permit the laser oscillations which reflect from both surfaces of the end optical element to enter the control region, an area on the back surface of the end reflector must have low reflectivity.

Figure 1:
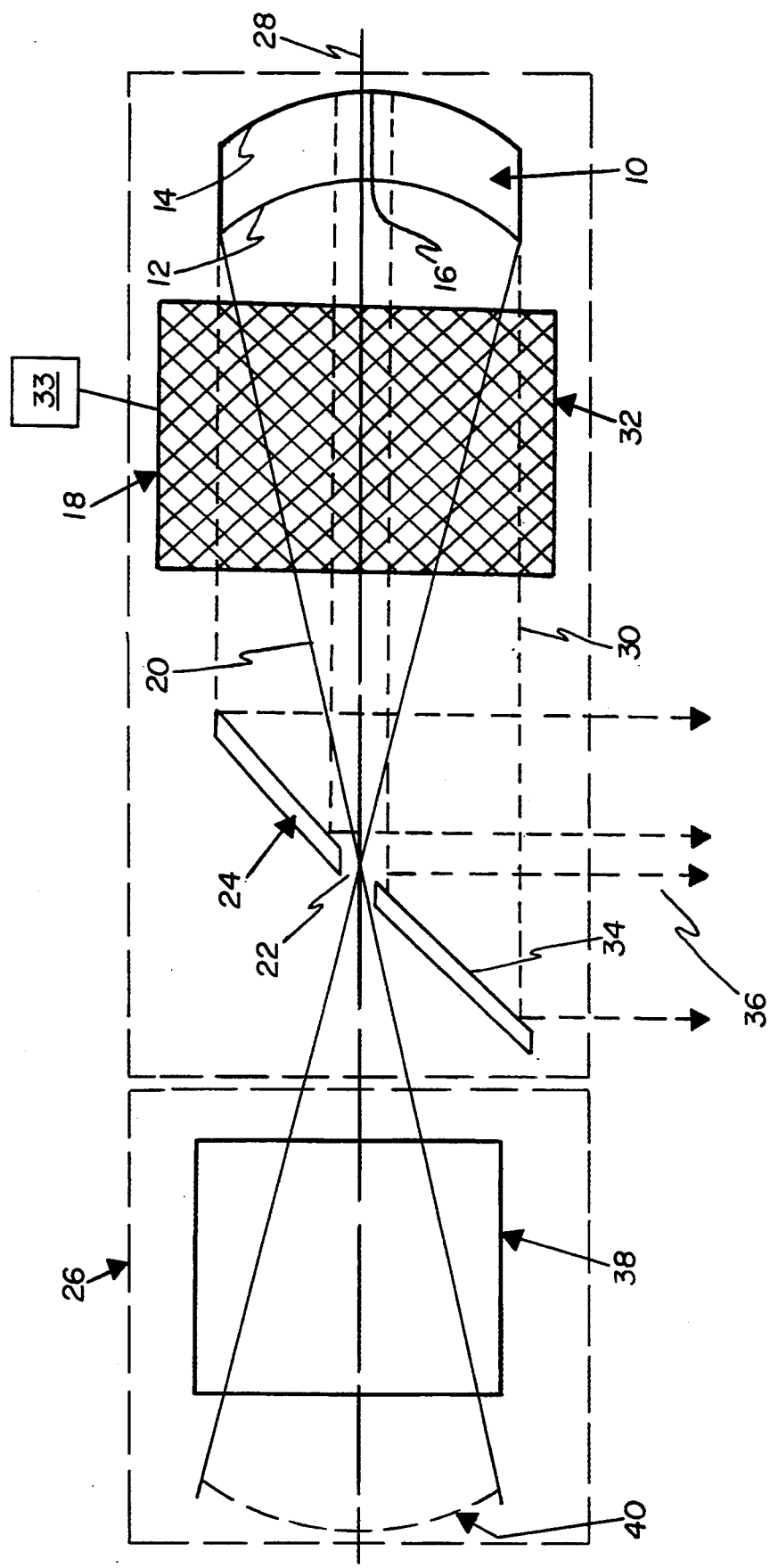
FIG. 1 is a schematic representation of the controlled, high-power laser oscillator of the present invention, showing the substantially symmetric alignment of the oscillator optics, gain medium, and control elements about colinear laser oscillator output and control optical axes.

Reference will now be made in detail to the present preferred embodiments of the invention, an example of which is illustrated in the accompanying drawings. Identical or similar structure will be identified with identical callouts. FIG. 1 schematically illustrates one embodiment of the apparatus of the present invention. Dual optical element 10 has a front surface 12 having reflectivity $R_1$, and a rear surface 14 having reflectivity $R_2$ except in the central portion thereof 16, which has low reflectivity. Laser radiation generated in oscillator 18, having an intensity $I_O$ and impinging on front surface 12 will be reflected therefrom, 20, with an intensity $I_O R_1$ and focused through hole 22 in separator element 24 from where it will enter control volume 26. Separator element 24 is shown to be placed at approximately 45° to the optical axis 28, although other angles work as long as the laser oscillations clear the physical structures of the oscillator. Laser radiation continuing through element 10 and reflected from surface 14 thereof 30 will be collimated thereby and have an intensity $I_O R_2 (1-R_1)^2$. After traveling through gain volume 32, which contains a gain medium, and which is excited by gain medium exciting means 33, laser energy 30 will be reflected from reflecting front surface 34 of separator element 24 and emerge as output laser beam 36. A portion of focused beam 20 will be returned to oscillator 18 through hole 22 in separator 24 after passing through control element 38 in control volume 26. In some applications, this might be accomplished with reflecting element 40. As stated, the central region 16 of dual reflecting optical element 10 is made poorly reflecting in order to prevent axial mode characteristics which might allow laser radiation in oscillator 18 to reflect from both surfaces 12,14 of dual optical element 10 and enter control volume 26.

The ratio of the total energy flux entering into the control volume 26 to the total energy flux at the output of oscillator 18 is $R_1/(R_2(1-R_1)^2)$, neglecting saturation effects. For high energy systems, the value of $R_1$ must be small to prevent optical damage to the elements in the control volume. Generally, a ratio having a maximum of a few percent would be sufficient.

Elements in the control volume may include: gratings, phase modulators, polarizers, polarization modulators, electro-optic switches, apertures, beam expanders, beam compressors, mirrors, lenses, longitudinal mode-lockers, spinning mirrors, narrow-band filters, and absorption cells, as examples.

More specifically, elements in the control volume could be used to permit grating tuning and longitudinal and transverse mode selection, while short pulses could be generated using a Q-switch. An electro-optic switch could be left on during the initial portion of the pulse and used as a pulse waveform tail clipper to truncate the pulse as desired. The optical system could also contain a phase-modulating crystal to control the frequency of the laser in order to eliminate chirp and to shift the output to line center or off of line center by some desired amount. For optimum control, the output of the laser would be heterodyned with a local oscillator and that heterodyne signal used to generate the appropriate dc voltage on the crystal to maintain the desired center frequency characteristics. A shaped voltage pulse, as a function of time, which is synchronized with the firing of the laser could be used to remove chirp caused by changes in the free-electron density and gain in the laser.

Figure 2:
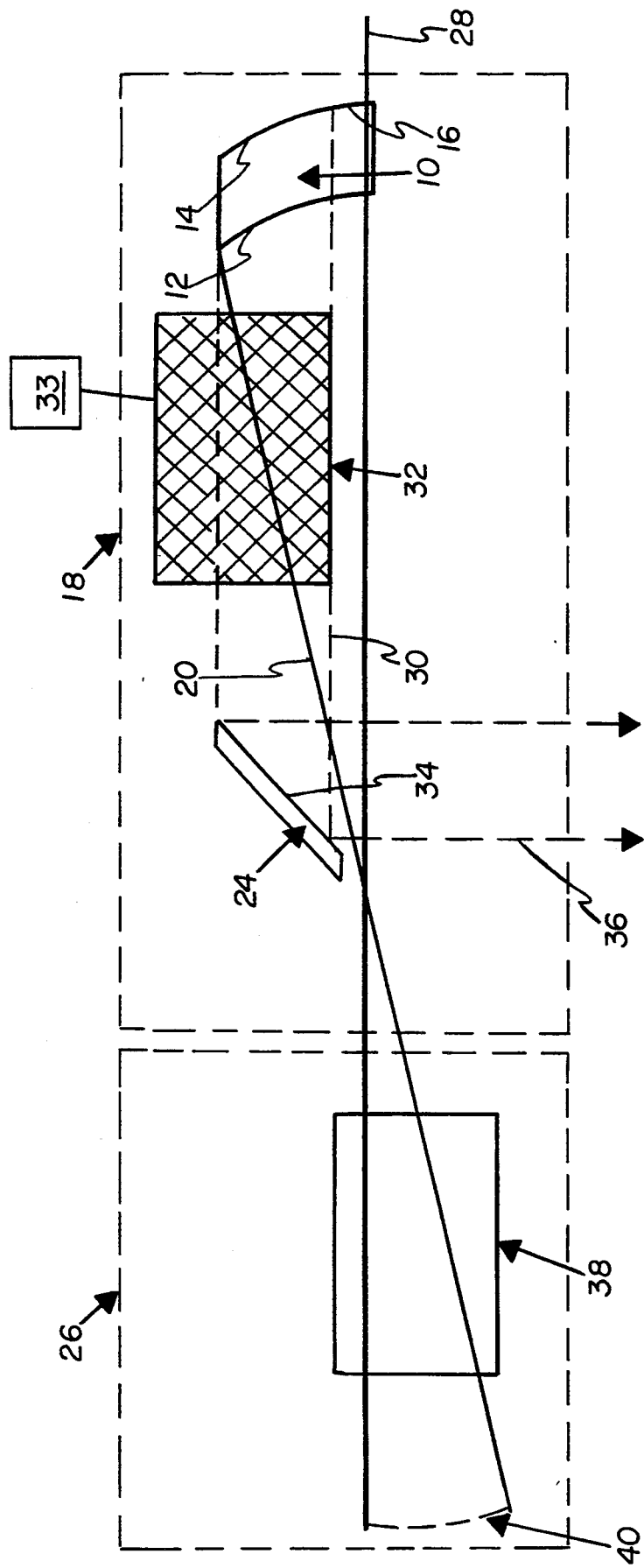
FIG. 2 is a schematic representation of the subject controlled, high-power laser oscillator showing an asymmetric orientation of the component elements about colinear laser oscillator output and control optical axes.

FIG. 2 shows an asymmetric orientation of the component elements about colinear laser oscillator output and control optical axes. Separator element 24, as shown, is a reflecting optic placed at a chosen angle with respect to axis 28, and serves to direct laser output beam 36 out of the oscillator. Optical element 10 is disposed such that oscillator energy 20 reflected from the front surface thereof is directed into control volume 26 past one edge of element 24. A hole in this optic is not required.

FIG. 3 shows an orientation of the optical elements where the laser oscillator output and control optical axes, 28o, and 28c, respectively, are not colinear.

The foregoing description of several preferred embodiments of the invention has been presented for purposes of illustration and description. It is not intended to be exhaustive or to limit the invention to the precise form disclosed, and obviously many modifications and variations are possible in light of the above teaching. For example, it would be apparent to one having ordinary skill in the art of lasers, after studying the present disclosure, that the Figures represent but a few of the possible configurations to accomplish the objects of the present invention. Moreover, dual optical element 10 in the Figures could be replaced by two optical elements, one behind the other. Additionally, one can utilize the reflecting separator element described in FIG. 2 to direct focused laser oscillator energy into the control volume, the substantially parallel output energy generated in the laser oscillator exiting directly therefrom. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A controlled, high-power laser oscillator comprising in combination:
   a. a laser gain medium for generating and amplifying laser oscillations;
   b. means for exciting said laser gain medium;
   c. at least one reflecting optical element located near one end of said gain medium, for returning laser oscillations thereto;
   d. a separator element located at the other end of said gain medium from said reflecting optical element, said reflecting optical element and said separator element defining a laser oscillator axis, which includes said gain medium, for dividing the laser energy generated in said gain medium into a laser energy output portion and a laser control output portion; and
   e. at least one control element for receiving the control portion of the laser energy, for controlling chosen characteristics of the control portion of the laser energy, and for returning the controlled laser energy to said gain medium through said separator element, said at least one reflecting element and said at least one control element defining a laser control axis.

2. The controlled, high-power laser oscillator as described in claim 1, wherein said separator element includes a partial reflector disposed at a chosen angle with respect to the laser oscillator axis, the reflected energy therefrom becoming the output of the laser oscillator, while the transmitted portion is directed into said at least one control element, said at least one control element returning the laser energy having chosen controlled characteristics through said separator element to said gain medium.

3. The controlled, high-power laser oscillator as described in claim 1, where in the laser oscillator axis and the control axis are colinear, and wherein said separator element includes a totally reflecting element disposed at a chosen angle with respect to the laser oscillator axis and having a hole therein located on the laser oscillator axis through which laser energy may pass and be incident on said at least one control element, and return therethrough to said gain medium after having the chosen characteristics controlled by said at least one control element.

4. The controlled, high-power laser oscillator as described in claim 3, wherein said at least one reflecting optical element is a single optical element having two reflecting surfaces, one behind the other along the laser oscillator axis, each surface having a radius of curvature, such that a portion of the laser energy is focused through the hole in said separator element, while a portion of the remainder thereof is substantially collimated such that the portion of the laser energy which is reflected by said separator element after passing through said gain medium is substantially collimated, said at least one reflecting optical element further having a portion thereof surrounding the laser oscillator axis having low reflectivity in order to prevent axial-mode laser oscillations which would permit laser energy from both surfaces thereof to be incident upon said at least one control element.

5. The controlled, high-power laser oscillator as described in claim 1, wherein said separator element includes a totally reflecting element disposed at a chosen angle with respect to the laser oscillator axis and having dimensions such that the control axis passes outside thereof.

6. The controlled, high-power laser oscillator as described in claim 1, wherein said at least one reflecting optical element is a single optical element having two reflecting surfaces, one behind the other along the laser oscillator axis, each surface having a radius of curvature, such that a portion of the laser energy is directed onto said at least one control element, while a portion of the remainder thereof is substantially collimated such that the portion of the laser energy which is reflected by said separator element after passing through said gain medium is substantially collimated, said at least one reflecting optical element further having a portion thereof surrounding the laser oscillator axis having low reflectivity in order to prevent axial-mode laser oscillations which would permit laser energy from both surfaces thereof to be incident upon said at least one control element.

7. The controlled, high-power laser oscillator as described in claim 1, wherein said separator element includes a totally reflecting element disposed at a chosen angle with respect to the control axis and having dimensions such that the laser oscillator axis passes outside thereof.

* * * * *